(12) United States Patent
Chen (10) Patent No.: US 6,419,183 B1
(45) Date of Patent: Jul. 16, 2002

(54) AIR CHUCK

(76) Inventor: Hsi-Tsai Chen, No. 36, Pao-Shan 6th St., Nan-Tun Dist., Taichung City (TW)

( * ) Notice: Subject to any disclaimer, the term of this patent is extended or adjusted under 35 U.S.C. 154(b) by 0 days.

(21) Appl. No.: 09/903,324

(22) Filed: Jul. 10, 2001

(30) Foreign Application Priority Data

May 15, 2001 (TW) ........................................ 90207904 U (51) Int. Cl.$^7$ .............................................. B65H 75/24
(52) U.S. Cl. .................................................. 242/571.1
(58) Field of Search .......................... 242/571.1, 571.2, 242/576.1; 279/2.06, 2.07, 2.08, 2.09, 2.23

(56) References Cited

U.S. PATENT DOCUMENTS

| | | | | |
|---|---|---|---|---|
| 3,863,857 A | * | 2/1975 | Smith ....................... | 242/571.1 |
| 4,854,520 A | * | 8/1989 | Gavin et al. .............. | 242/571.1 |
| 5,690,300 A | * | 11/1997 | Iannucci ................... | 242/571.2 |
| 5,951,023 A | * | 9/1999 | Ryan ........................ | 242/571.1 |
| 6,059,218 A | * | 5/2000 | Berube ...................... | 279/2.07 |
| 6,065,715 A | * | 5/2000 | Andersson ................ | 242/571.1 |

FOREIGN PATENT DOCUMENTS

JP 2-70642 * 2/1990

* cited by examiner

*Primary Examiner*—William A. Rivera
(74) *Attorney, Agent, or Firm*—Sheridan Ross PC (57) ABSTRACT

An air chuck includes a deformable air bladder sleeved on and secured on a core member, and two end caps mounted respectively on two end portions of the core member. Multiple connecting rods and biasing members are disposed to surround the air bladder in a staggered arrangement, and are confined in leaf members that are disposed circumferentially around the air bladder. Inflation of an air chamber in the air bladder enables the air bladder to urge the leaf members in radial outward directions relative to a core axis such that inner wall segments of the leaf members abut against the biasing members and such that radial outward movements of the leaf members are limited by the connecting rods.

7 Claims, 7 Drawing Sheets

AIR CHUCK

BACKGROUND OF THE INVENTION

1. Field of the Invention

The invention relates to an air chuck, more particularly to an air chuck that can better withstand wear and that can buffer and compensate instantaneous expansion of an air bladder.

2. Description of the Related Art

An air chuck is rotatably mounted on a mandrel of a machine, and is expandable by use of pressurized air so as to hold a roll of web material, such as paper, rubber, plastic, metal, fabric, wire, or the like, thereon.

Figure 1:
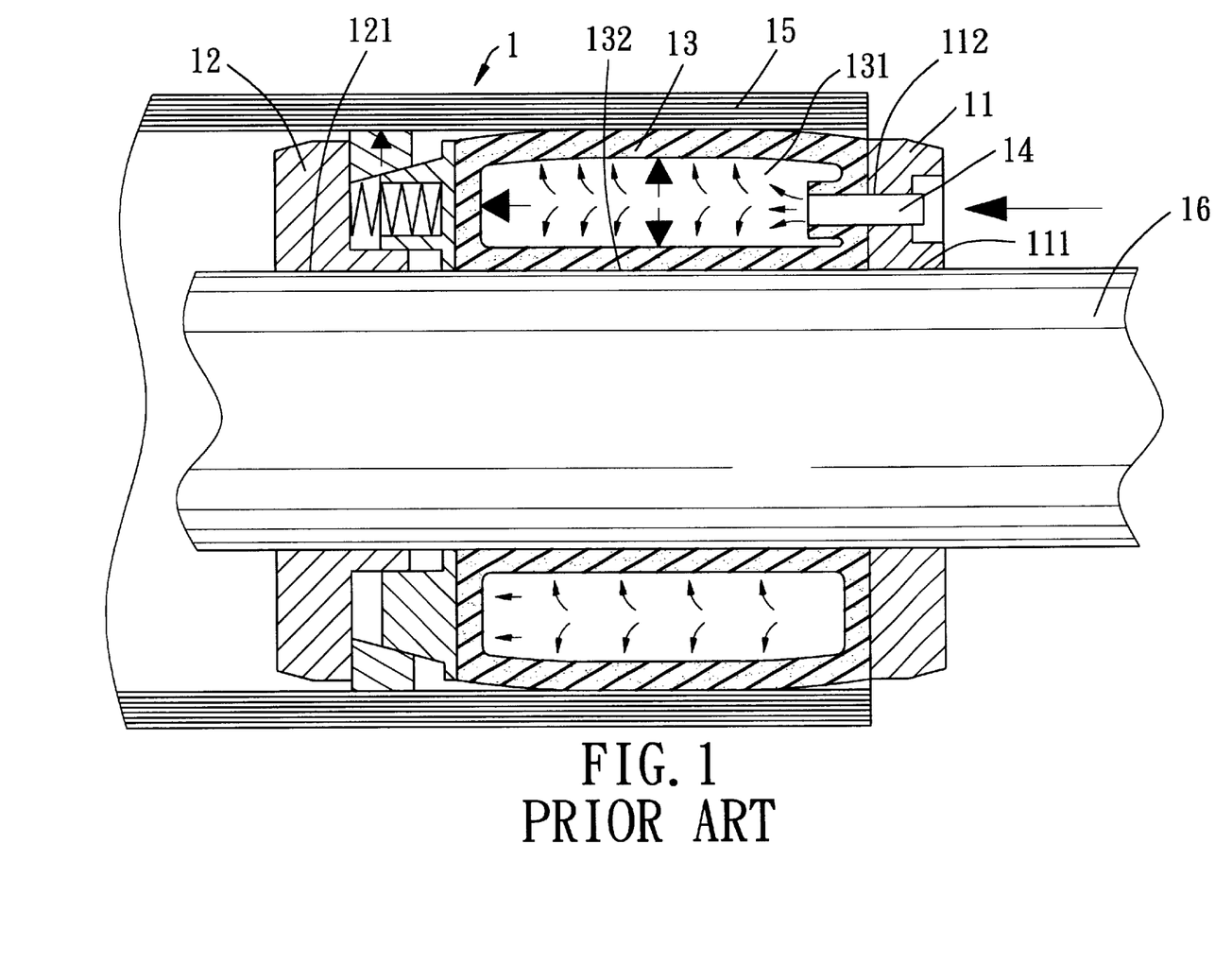
FIG. 1 is a schematic sectional view of a conventional air chuck for holding a roll of web material on a mandrel.

Referring to FIG. 1, a conventional air chuck 1 includes two end caps 11, 12, and a generally cylindrical air bladder 13 mounted between the end caps 11, 12 and formed from a rubber material. The air bladder 13 confines an air chamber 131 and has an axial through hole 132 communicated with cap holes 111, 121 in the end caps 11, 12. The end cap 11 is further provided with an air passage 112 communicated with the air chamber 131, and an inflating valve 14 is connected to the air passage 112 for inflating or deflating the air chamber 131. When the inflating valve 14 is connected to a pressurized air source, pressurized air is supplied to the air chamber 131 to inflate the air chamber 131 so as to expand the air bladder 13 in radial outward directions, thereby holding tightly a roll 15 of web material on the air chuck 1 and a mandrel 16 extending through the axial through hole 132. As such, rotation of the mandrel 16 will bring the air chuck 1 and the roll 15 to rotate therewith so as to feed or wind the web material on the roll 15.

However, as a considerably high pressure is required to inflate the air bladder 13 to thereby retain the roll 15 on the air chuck 1, instantaneous expansion of the air bladder 13 may result in breaking or explosion of the air bladder 13, which is dangerous. Moreover, replacement of the air bladder 13 is inconvenient and costly.

SUMMARY OF THE INVENTION

Therefore, the main object of the present invention is to provide an air chuck that can better withstand wear and that can buffer and compensate instantaneous expansion of an air bladder. Accordingly, an air chuck of the present invention includes a tubular core member, a resilient deformable air bladder, an air passage, a pair of end caps, a plurality of angularly spaced apart connecting rods, a plurality of angularly spaced apart biasing members, and a plurality of hollow leaf members. The core member has opposite first and second core end portions and a core axis. The air bladder is sleeved on the core member, and has opposite first and second bladder end segments retained respectively on the core member, and an intermediate bladder segment disposed between the first and second bladder end segments. The bladder forms an inflatable air chamber that extends around the core member. The air passage is in fluid communication with the air chamber for inflating and deflating the air chamber. The end caps are mounted respectively on the first and second core end portions. The connecting rods are disposed circumferentially around the air bladder. Each of the connecting rods has a rod axis parallel to the core axis, and opposite rod ends mounted respectively on the end caps. The biasing members are disposed circumferentially around the air bladder. Each of the biasing members has a coil spring section with a spring axis parallel to the core axis, and a pair of coupling end sections that extend in opposite directions from the coil spring section and that are mounted respectively on the end caps. Each of the biasing members is disposed between an adjacent pair of the connecting rods. The leaf members are disposed circumferentially around the air bladder. Each of the leaf members includes a curved inner wall segment, a curved outer wall segment disposed radially, spacedly and outwardly from the inner wall segment, and a pair of lateral wall segments that interconnect the inner and outer wall segments. Each of the leaf members confines a set of the connecting rods and a set of the biasing members therein. Inflation of the air chamber enables the air bladder to urge the leaf members in radial outward directions relative to the core axis such that the inner wall segments abut against the coil spring sections of the biasing members and such that radial outward movements of the leaf members are limited by the connecting rods.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
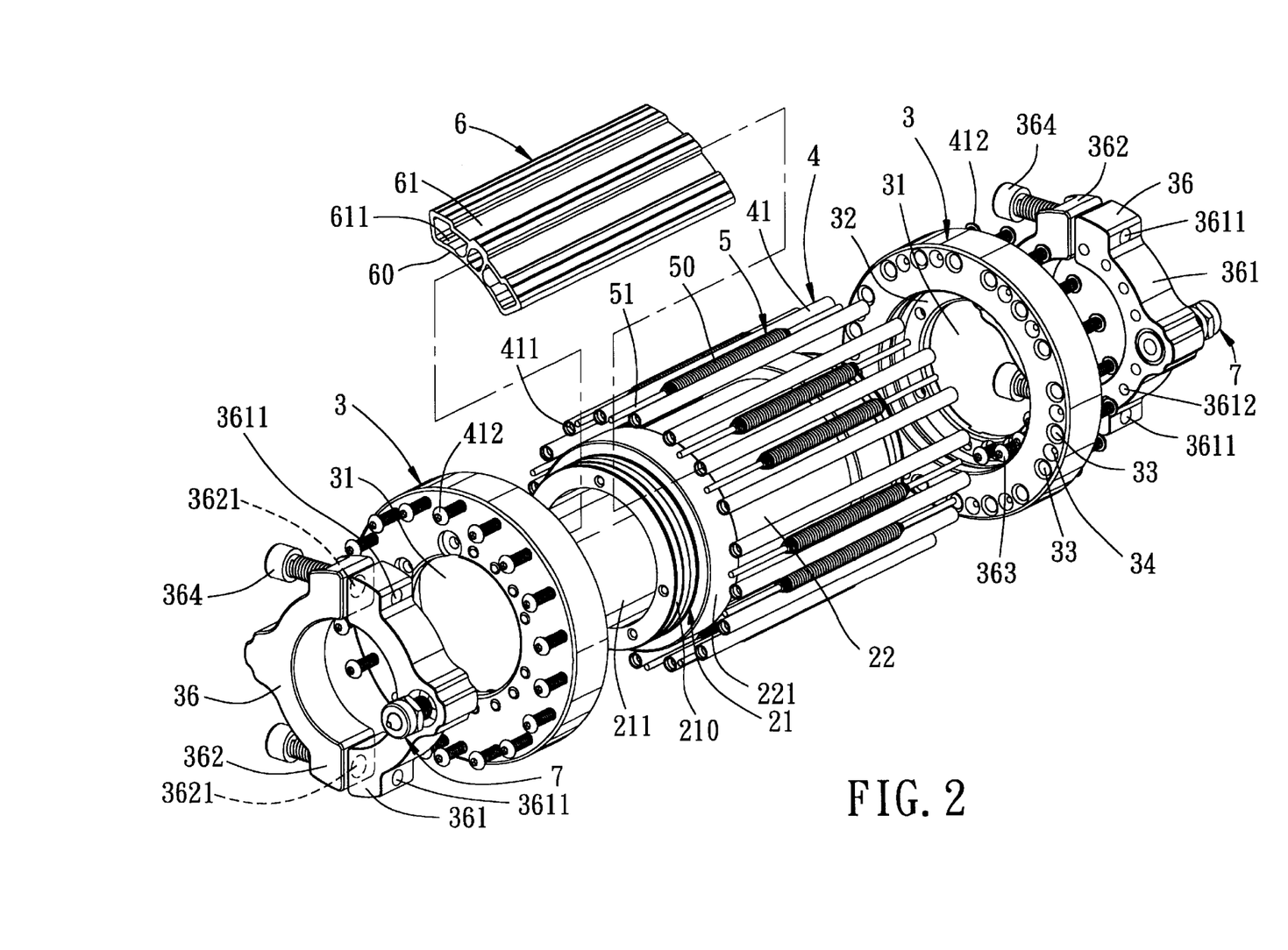
FIG. 2 is an exploded perspective view of a preferred embodiment of an air chuck according to this invention.
Figure 3:
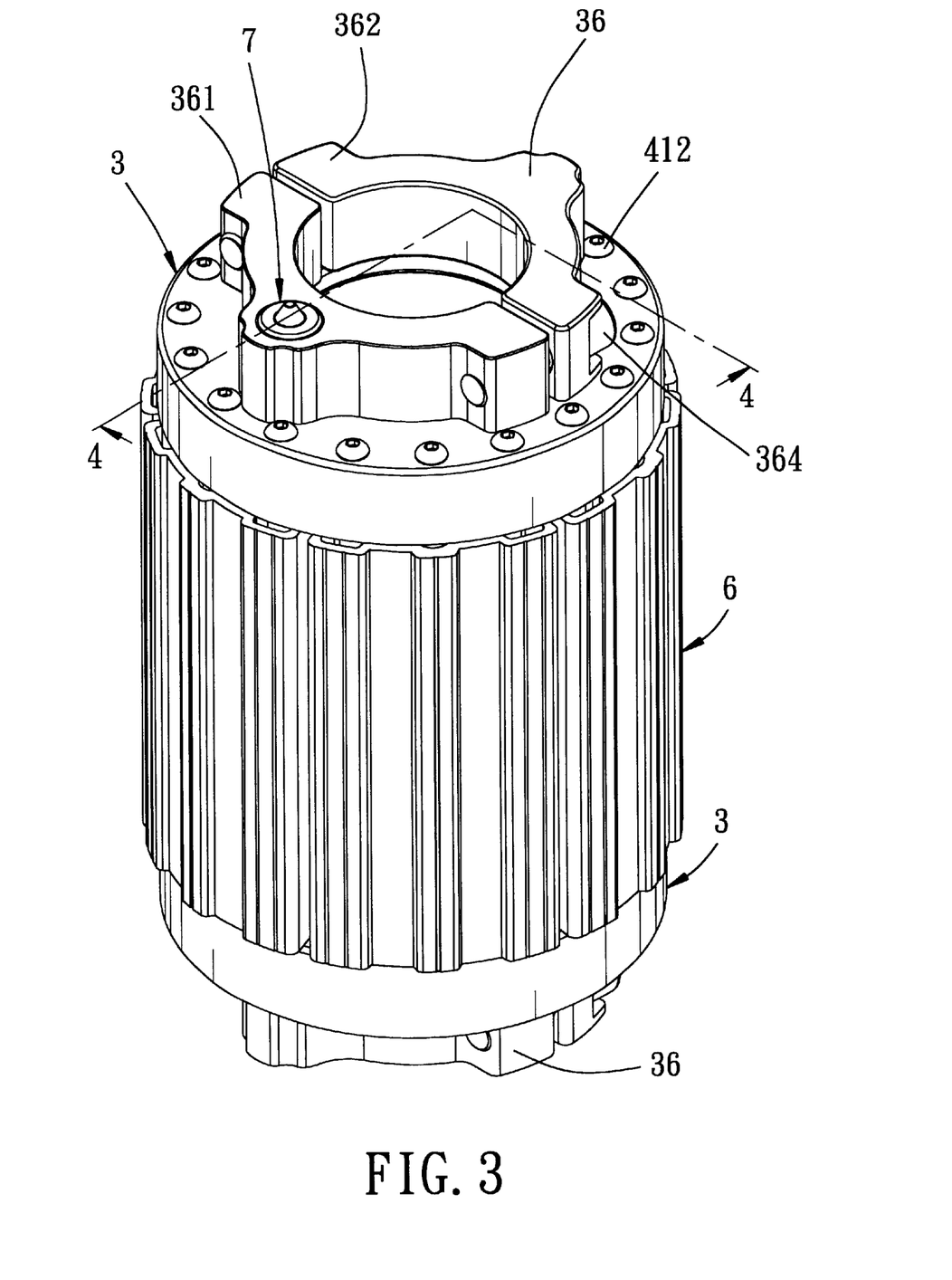
FIG. 3 is a perspective view of the preferred embodiment in an assembled state.
Figure 4:
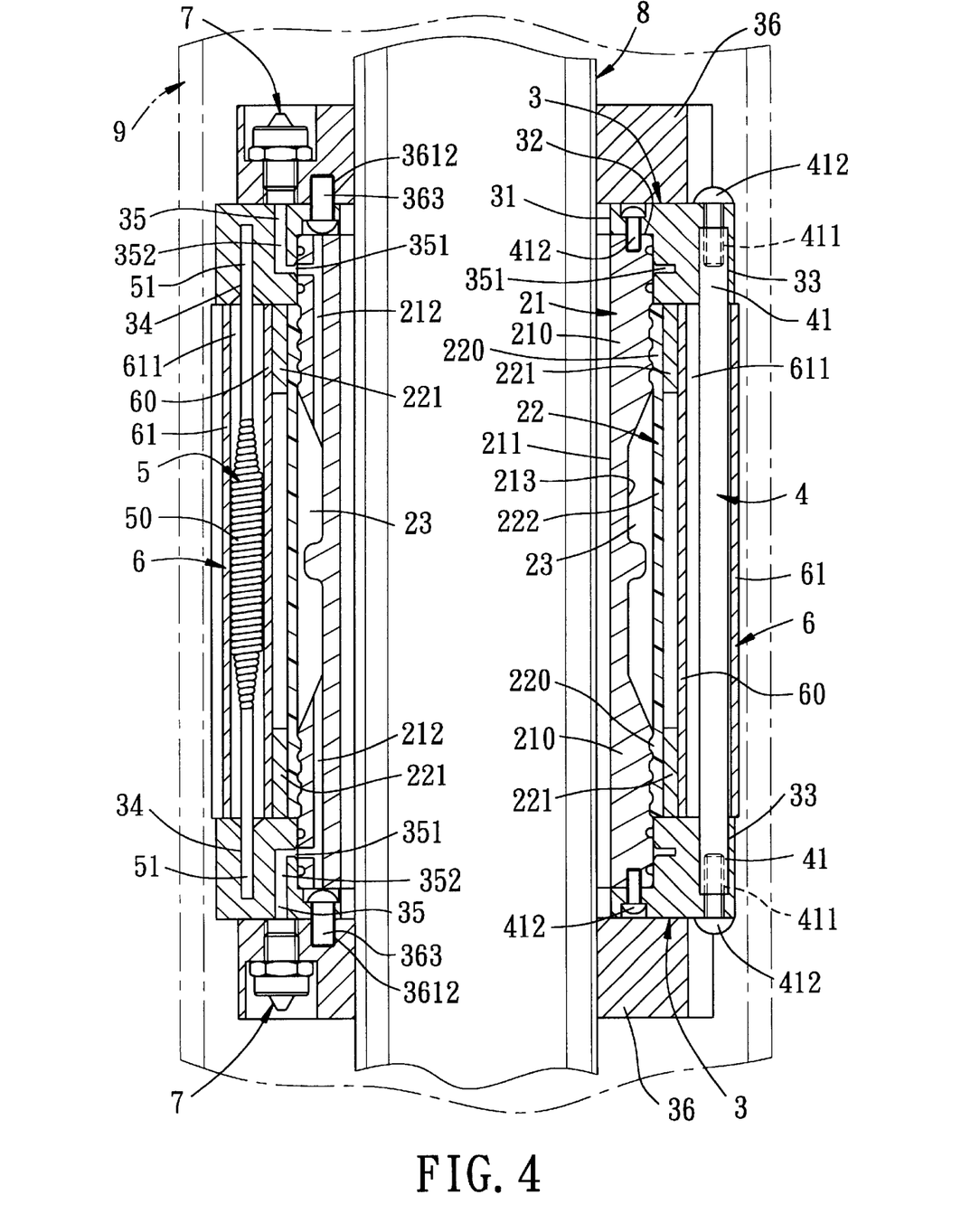
FIG. 4 is a sectional view taken along line 44 of FIG. 3.

Referring to FIGS. 2 to 4, the preferred embodiment of an air chuck according to the present invention is shown to include a tubular core member 21, a resilient deformable air bladder 22, at least one air passage, a pair of end caps 3, a plurality of angularly spaced apart connecting rods 4, a plurality of angularly spaced apart biasing members 5, and a plurality of hollow leaf members 6.

The core member 21 has opposite first and second core end portions 210, an intermediate core portion disposed between the first and second core end portions 210, and a core axis. The intermediate core portion has an outer diameter less than that of the first and second core end portions 210 so as to configure the intermediate core portion with a recessed external surface 213 relative to the first and second core end portions 210. In addition, the core member 21 is formed with a first mandrel hole 211 that extends along the core axis.

The air bladder 22 is tubular in shape and is formed from a flexible material, such as rubber. The air bladder 22 is sleeved on the core member 21, and has opposite first and second bladder end segments 220 and an intermediate bladder segment 222 disposed therebetween. A pair of band members 221 are sleeved respectively on the first and second bladder segments 220 so as to retain the latter fittingly, sealingly and respectively on the first and second core end portions 210 of the core member 21. The air bladder 22 forms an inflatable air chamber 23 that extends around the core member 21. In this embodiment, the intermediate bladder segment 222 cooperates with the recessed external surface 213 to confine the inflatable air chamber 23.

The end caps 3 are mounted respectively on the first and second core end portions 210. Each of the end caps 3 is formed with a second mandrel hole 31 that is aligned with the first mandrel hole 211, and a core mounting hole 32 communicated with the second mandrel hole 31 for retaining one of the first and second core end portions 210, and includes a plurality of angularly spaced apart rod holes 33 disposed circumferentially around the second mandrel hole 31 and the core mounting hole 32, and a plurality of angularly spaced apart insert holes 34 disposed circumferentially around the core mounting hole 32. Each of the insert holes 34 is disposed between an adjacent pair of the rod holes 33.

The air passage is in fluid communication with the air chamber 23 for inflating and deflating the air chamber 23. In this embodiment, there are two air passages, each of which includes a first passage segment 212 formed in one of the first and second core end portions 210 and a second passage segment 35 formed in one of the end caps 3 and in fluid communication with the first passage segment 212. The second passage segment 35 includes an axial portion 352 and a radially extending annular portion 351 that communicates the first passage segment 212 with the axial portion 352.

The connecting rods 4 are disposed circumferentially around the air bladder 22. Each of the connecting rods 4 has a rod axis parallel to the core axis, and opposite rod ends 41 mounted respectively in the rod holes 33 in the end caps 3. Each of the rod ends 41 is provided with an internal threaded portion 411 for threaded engagement with a respective one of threaded fasteners 412.

The biasing members 5 are disposed circumferentially around the air bladder 22. Each of the biasing members 5 has a coil spring section 50 with a spring axis parallel to the core axis, and a pair of coupling end sections 51 that extend in opposite directions from the coil spring section 50 and that are mounted respectively in the insert holes 34 in the end caps 3. Each of the biasing members 5 is disposed between an adjacent pair of the connecting rods 4.

The leaf members 6 are disposed circumferentially around the air bladder 22. Each of the leaf members 6 includes a curved inner wall segment 60, a curved outer wall segment 61 disposed radially, spacedly and outwardly from the inner wall segment 60, and a pair of lateral wall segments that interconnect the inner and outer wall segments 60, 61. Each of the leaf members 6 confines a lengthwise extending through hole 611 of a predetermined size for passage of a set of the connecting rods 4 and a set of the biasing members 5 therethrough.

The air chuck further includes a pair of mandrel clamps 36 and at least one inflating valve 7. The mandrel clamps 36 are mounted respectively on the end caps 3 and are adapted to clamp a mandrel 8 that is extended through the first and second mandrel holes 211, 31. Each of the mandrel clamps 36 includes generally semi-annular first and second clamp halves 361, 362 which cooperate to define a circular clamping hole adapted for extension of the mandrel 8 and which are coupled by use of threaded rods 364 that extend through transversely extending holes 3611, 3621 formed in opposite end portions of the first and second clamp halves 361, 362. The first clamp half 361 is further formed with a plurality of axially extending locking holes 3612. Locking fasteners 363 are extended through a respective one of the end caps 3 and engage the locking holes 3612 in the first clamp half 361 to thereby secure the first clamp half 361 to the respective one of the end caps 3.

In this embodiment, there are two inflating valves 7, each of which is mounted on one of the mandrel clamps 36 and is in fluid communication with the axial portion 352 of the second passage segment 35 of the air passage for inflating or deflating the air chamber 23.

During assembly, referring back to FIGS. 2 to 4, the air bladder 22 is sleeved and retained on the core member 21, and one of the end caps 3 with the corresponding mandrel clamp 36 is mounted on one of the first and second core end portions 210 of the core member 21. Then, the connecting rods 4 are respectively inserted into the corresponding rod holes 33 in said one of the end caps 3, with the corresponding rod ends 41 retained therein by means of the threaded fasteners 412, and the biasing members 5 are respectively inserted into the corresponding insert holes 34 in said one of the end caps 3, with the corresponding coupling end sections 51 retained therein. At this point, the leaf members 6 can be sleeved on the connecting rods 4 and the biasing members 5 to confine the same in the through holes 611 such that the leaf members 6 surround the air bladder 22. Lastly, the other one of the end caps 3 with the corresponding mandrel clamp 36 is mounted on the other one of the first and second core end portions 210 of the core member 21 in a manner similar to that described above such that the connecting rods 4 and the biasing members 5, which are confined by the leaf members 6, are mounted on the end caps 3 and surround the air bladder 2.

Figure 5:
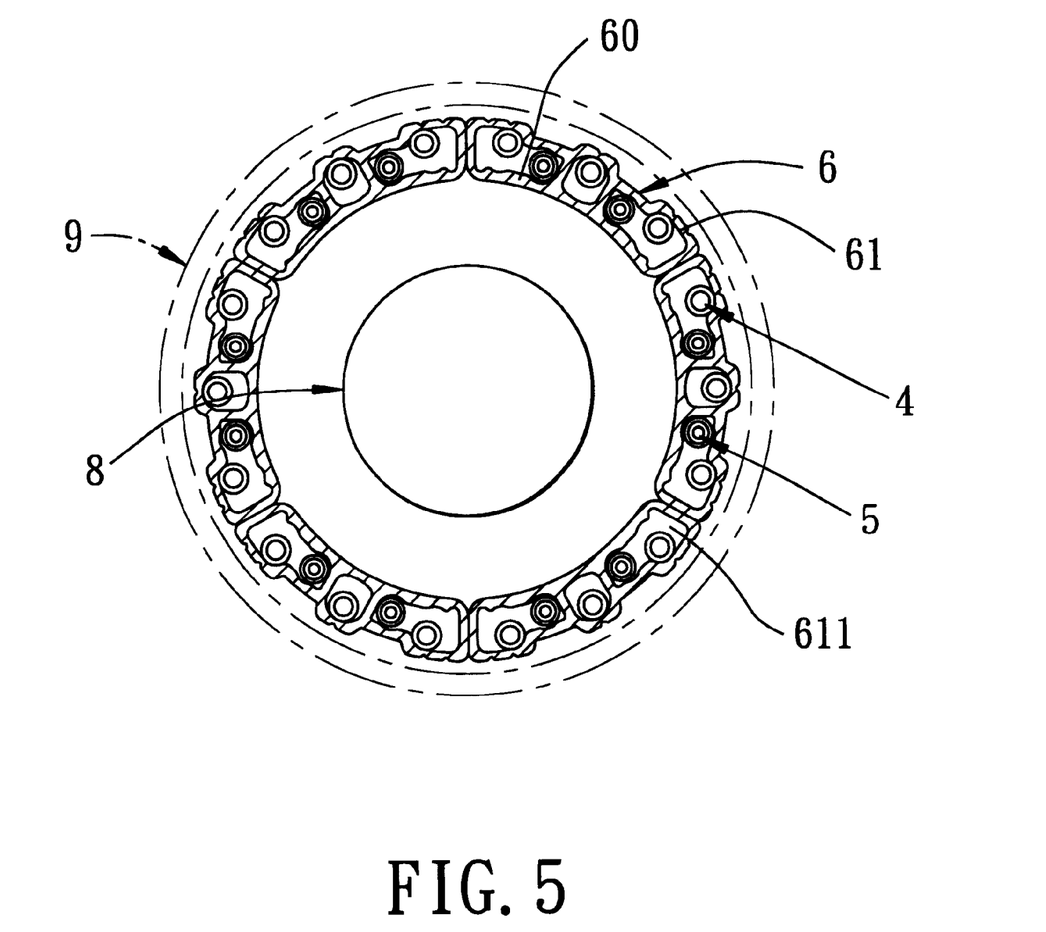
FIG. 5 is a cross-sectional view of the preferred embodiment in part and in a state prior to operation.
Figure 6:
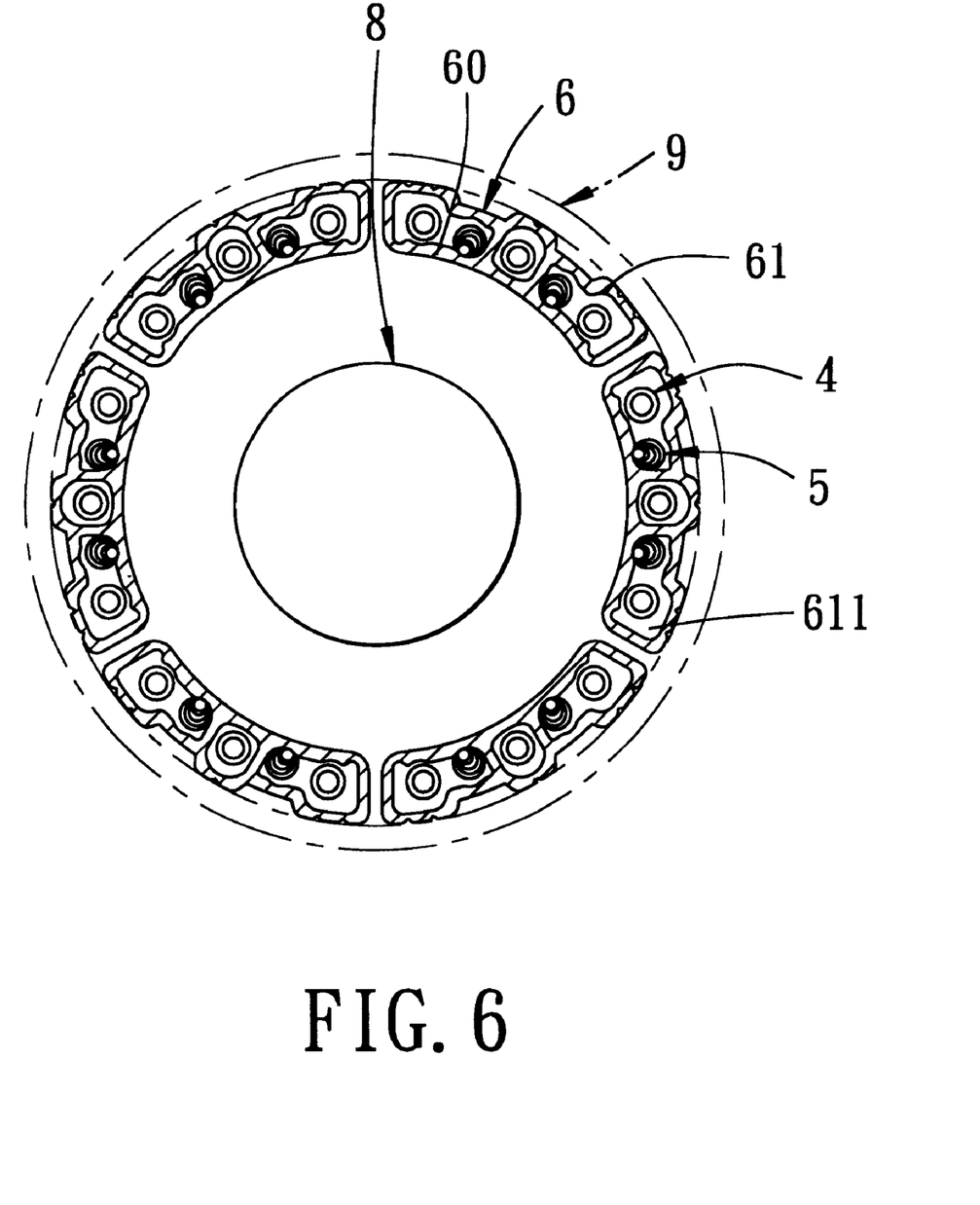
FIG. 6 is a view similar to FIG. 5, but showing the preferred embodiment in a state after operation.

In operation, with further reference to FIGS. 4 to 6, the air chuck of the present invention is fitted on the mandrel 8, and is positioned thereon by tightening the mandrel clamps 36. A roll 9 of web material is fitted over the air chuck, and either one of the inflating valves 7 can be connected to a compressed air source to supply pressurized air via the air passage to the air chamber 23 to inflate the air chamber 23. Inflation of the air chamber 23 enables the air bladder 22 to urge the leaf members 6 in radial outward directions relative to the core axis such that the inner wall segments 60 abut against the coil spring sections 50 of the biasing members 5 and such that radial outward movements of the leaf members 6 are limited by the connecting rods 4. As a result, the roll 9 of web material is held tightly on the air chuck, and can rotate synchronously with the mandrel 8 to permit feeding or winding of web material on the roll 9.

Figure 7:
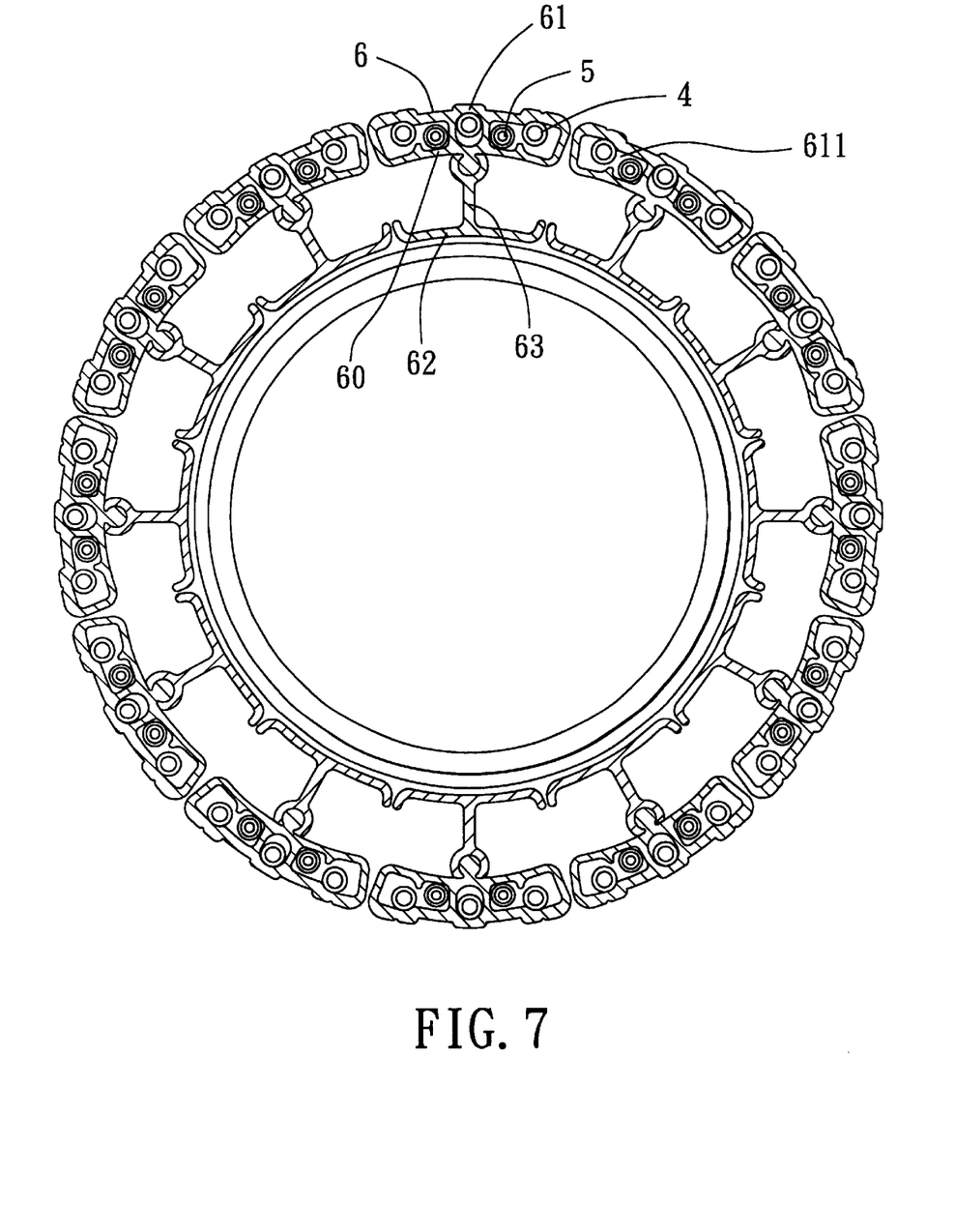
FIG. 7 is a view similar to FIG. 5, but showing modified leaf members of the air chuck according to this invention.

Referring to FIG. 7, each of the leaf members 6 further includes a bladder contact plate 62 disposed to contact the air bladder 22, and a coupling arm 63 extending from the bladder contact plate 62 and coupled to the inner wall segment 60. By virtue of this configuration, the core member 21 can be used with end caps 3 of different sizes (not shown), and the air chuck can be adapted for clamping rolls 9 of varying diameters.

In sum, the air chuck of the present invention has the following advantages:

1. As expansion of the air bladder 22 is limited by the connecting rods 4, the air bladder 22 is not likely to crack or explode under pressure.
2. If the supplied pressure is excessively high during inflation to expand the air bladder 22, the biasing members 5 will provide a buffering, compensating function so that a suitable buffering clearance is maintained between the leaf members 6 and the roll 9, thereby avoiding any occurrence of unduly tight or loose clamping of the roll 9 on the air chuck.

3. The components of the air chuck of the present invention can be standardized for mass production to save production costs.

4. Due to the arrangement of the bladder contact plates 62 and the coupling arms 63 for the leaf members 6, end caps 3 of different sizes can be used, and the air chuck can be used to hold rolls 9 of different diameters thereon.

5. The outer wall segments 61 of the leaf members 6 can be formed from a light metal material to better withstand scratching and wear. As such, the leaf members 6 can last longer, and can support a roll of web material of a relatively greater load as compared with the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An air chuck comprising:

a tubular core member having opposite first and second core end portions and a core axis;

a resilient deformable air bladder sleeved on said core member and having opposite first and second bladder end segments retained respectively on said core member, and an intermediate bladder segment disposed between said first and second bladder end segments, said air bladder forming an inflatable air chamber that extends around said core member;

an air passage in fluid communication with said air chamber for inflating and deflating said air chamber;

a pair of end caps mounted respectively on said first and second core end portions;

a plurality of angularly spaced apart connecting rods disposed circumferentially around said air bladder, each of said connecting rods having a rod axis parallel to said core axis and opposite rod ends mounted respectively on said end caps;

a plurality of angularly spaced apart biasing members disposed circumferentially around said air bladder, each of said biasing members having a coil spring section with a spring axis parallel to said core axis, and a pair of coupling end sections that extend in opposite directions from said coil spring section and that are mounted respectively on said end caps, each of said biasing members being disposed between an adjacent pair of said connecting rods; and a plurality of hollow leaf members disposed circumferentially around said air bladder, each of said leaf members including a curved inner wall segment, a curved outer wall segment disposed radially, spacedly and outwardly from said inner wall segment, and a pair of lateral wall segments that interconnect said inner and outer wall segments, each of said leaf members confining a set of said connecting rods and a set of said biasing members therein;

wherein inflation of said air chamber enables said air bladder to urge said leaf members in radial outward directions relative to said core axis such that said inner wall segments abut against said coil spring sections of said biasing members and such that radial outward movements of said leaf members are limited by said connecting rods.

2. The air chuck according to claim 1, wherein said core member further has an intermediate core portion disposed between said first and second core end portions, said intermediate core portion having an outer diameter less than that of said first and second core end portions so as to configure said intermediate core portion with a recessed external surface relative to said first and second core end portions, said air bladder being tubular in shape, said first and second bladder end segments being retained fittingly, sealingly and respectively on said first and second core end portions, said intermediate bladder segment cooperating with said recessed external surface to confine said inflatable air chamber.

3. The air chuck according to claim 2, wherein said air passage includes a first passage segment formed in one of said first and second core end portions and a second passage segment formed in one of said end caps and in fluid communication with said first passage segment.

4. The air chuck according to claim 3, wherein:

said core member is formed with a first mandrel hole that extends along said core axis;

each of said end caps being formed with a second mandrel hole that is aligned with said first mandrel hole;

said air chuck further comprising a pair of mandrel clamps mounted respectively on said end caps and adapted to clamp a mandrel that is extended through said first and second mandrel holes.

5. The air chuck according to claim 4, further comprising an inflating valve mounted on one of said mandrel clamps and in fluid communication with said second passage segment of said air passage.

6. The air chuck according to claim 2, further comprising a pair of band members sleeved respectively on said first and second bladder end segments for retaining said first and second bladder end segments on said first and second core end portions.

7. The air chuck according to claim 1, wherein each of said leaf members further includes a bladder contact plate disposed to contact said air bladder, and a coupling arm extending from said bladder contact plate and coupled to said inner wall segment.

* * * * *